United States Patent
de Lallee et al.

[11] 4,133,377
[45] Jan. 9, 1979

[54] THIN-FILM HEAT EXCHANGER

[75] Inventors: Jacques de Lallée, Grenoble; Gérard Marie, Eybens; Robert Moracchioli, Grenoble, all of France

[73] Assignee: Commissariat a l'Energie Atomique, Paris, France

[21] Appl. No.: 766,574

[22] Filed: Feb. 8, 1977

[30] Foreign Application Priority Data

Feb. 12, 1976 [FR] France ................. 76 03875

[51] Int. Cl.$^2$ .................. F28D 3/04; F28F 1/06; F28F 25/04
[52] U.S. Cl. .................. 165/118; 165/167; 165/174; 165/177; 165/DIG. 1
[58] Field of Search .............. 165/115, 118, 174, 177, 165/179, DIG. 1

[56] References Cited

U.S. PATENT DOCUMENTS

| 3,371,709 | 3/1968 | Rosenblad | 165/115 |
| 3,502,140 | 3/1970 | Dawson | 165/118 |
| 3,913,667 | 10/1975 | Meylan et al. | 165/115 |
| 3,995,689 | 12/1976 | Cates | 165/DIG. 1 |

FOREIGN PATENT DOCUMENTS 1245284  9/1960  France ................. 165/177

Primary Examiner—Charles J. Myhre
Assistant Examiner—S. Richter
Attorney, Agent, or Firm—Sidney W. Millard

[57] ABSTRACT

The heat exchanger comprises at least one heat-transfer wall which forms a separation between a hot primary fluid and a secondary fluid to be heated. Each heat-transfer wall is either a vertical cylinder having a cross-section in the form of a circle with a wavy profile in the case of a tubular heat exchanger or a vertical rectangular plate having wavy corrugations in the case of a plate-type exchanger, a series of assembled plates being intended to form leak-tight compartments for receiving primary fluid and secondary fluid in alternate succession. The secondary fluid is introduced into the upper end of the heat-transfer wall in the vicinity of the wave crests of the wall face which is directed towards the fluid.

12 Claims, 8 Drawing Figures

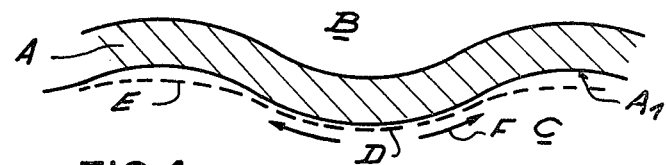
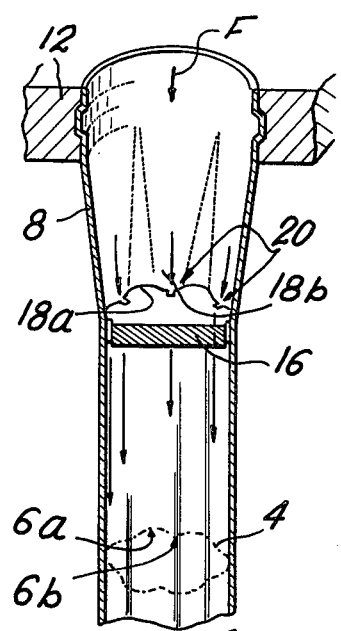
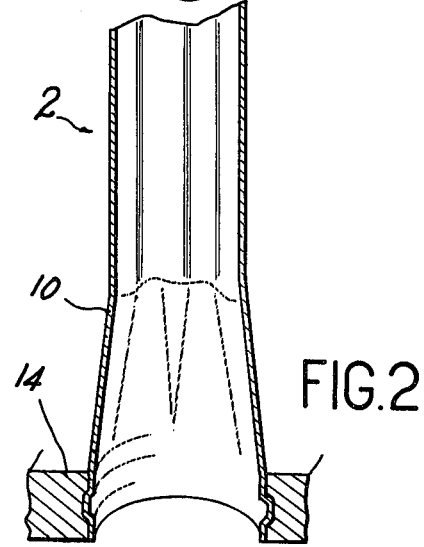
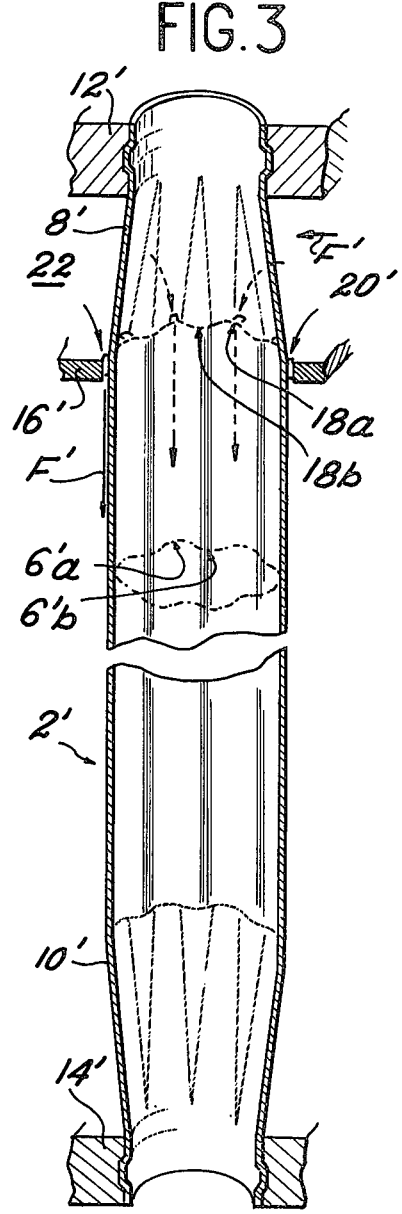

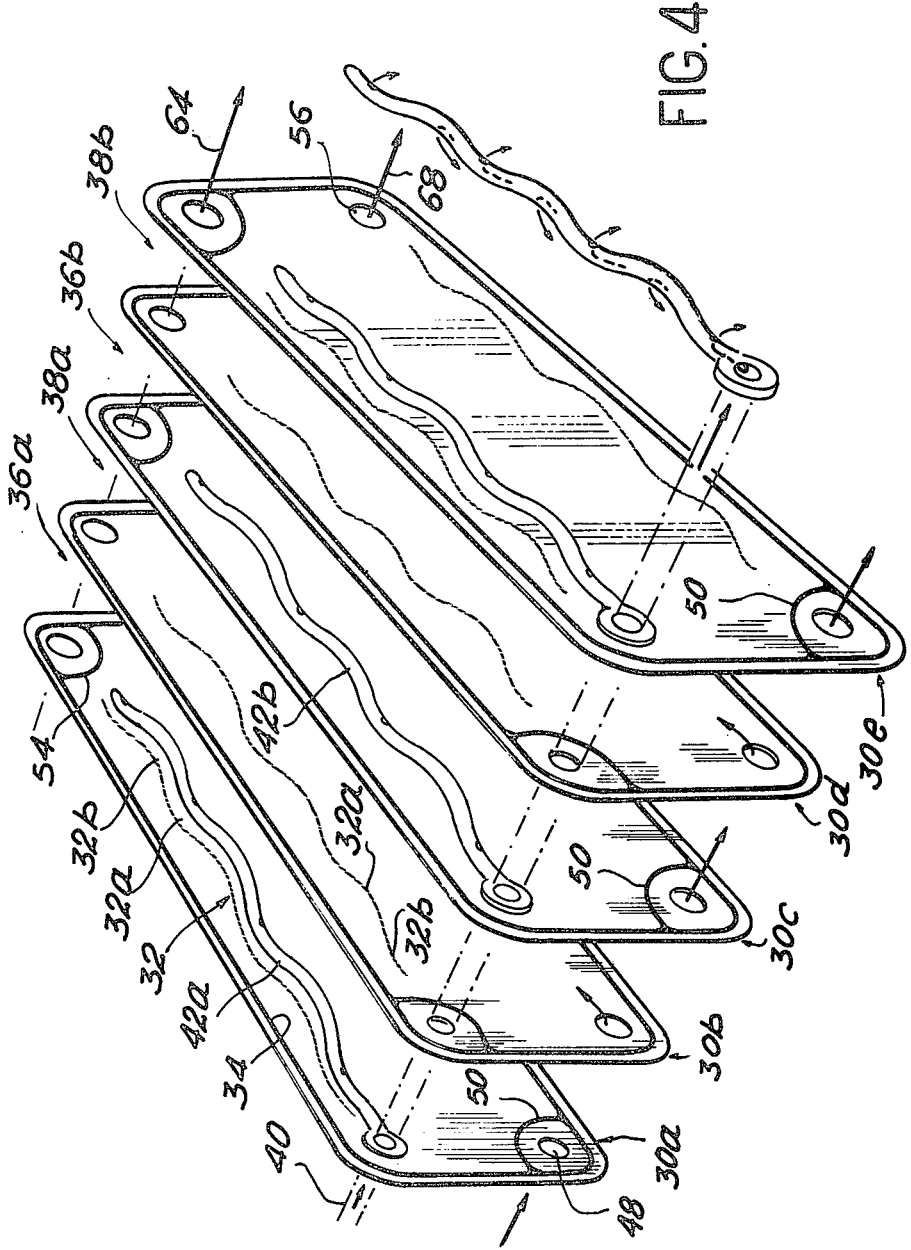

THIN-FILM HEAT EXCHANGER

This invention relates to a thin-film heat exchanger.

As is already known, a heat exchanger contains two fluids which circulate in regions separated by one or a number of heat-transfer surfaces. There is present on the one hand a primary fluid which can be designated as the hot fluid and on the other hand a secondary fluid which can be designated as the cold fluid. The heat released by the primary fluid and transferred to the secondary fluid across the heat-transfer wall produces an increase in temperature of said secondary fluid. In the case of thin-film heat exchangers, the secondary fluid does not occupy the entire second region but flows along the heat-transfer wall in thin films. An example of this type is the so-called "falling-film" exchanger.

Heat exchangers of these types include those in which the heat-exchange wall has wavy corrugations, the generating-lines of which are parallel to the direction of flow of the fluid to be heated.

In order that the design principle of these heat exchangers may be more readily understood, a fragmentary horizontal sectional view of the wall of a heat exchanger of this type is accordingly shown in FIG. 1.

The heat-exchanger wall A provides a separation between a compartment B and a compartment C in which the secondary fluid is circulated and to which heat is transferred by the primary fluid contained in said compartment B. The wall A has wavy corrugations which, in the case of the face A1 which is directed towards the compartment C, therefore consist of a series of concave waves such as those designated by the reference E and of convex waves such as those designated by the reference D. The film of secondary liquid falls vertically downwards along the wall. The capillary forces indicated schematically by the arrows F produce action on that fraction of the secondary liquid film which is limited by the broken lines. In the zones D of convex waves, said capillary forces tend to reduce the thickness of the film and therefore to increase said thickness in the zones having concave waves.

This invention relates to thin-film heat exchangers which employ a corrugated separation surface and to improvements for utilizing the work effect of the capillary forces. Said improvements essentially lie in a particular mode of suppy of secondary fluid which generally promotes a reduction in thickness of the liquid film. To this end, the uniform secondary fluid supply which was employed in devices of the prior art is replaced by a secondary fluid supply which is localized at predetermined portions of the heat-transfer surface. In more exact terms, this supply takes place at the upper end of the heat-transfer surface at the vertices or crests of the convex waves of that heat-transfer wall which is directed towards the secondary fluid.

Under the action of the capillary forces, the liquid film at the crest of the convex waves has a tendency to diverge on each side of said convex wave and to pass towards the troughs of the two adjacent concave waves. This accordingly results in a reduction in thickness of the liquid film and this latter spreads in a thin sheet of liquid which is distributed over the entire wave surface. If introduction is carried out in the form of a film at the crest D of each convex wave of the face $A_1$, a liquid film is accordingly obtained over the entire face $A_1$.

In more precise terms, the heat-exchanger for exchanging heat between a first fluid or so-called hot fluid and a second fluid to be heated, of the type comprising at least one wall providing a separation between said fluids through which a heat transfer process takes place, is distinguished by the fact that the wall aforesaid which comprises an upper end is a cylindrical surface in which the generating-lines are vertical and the cross-section of which is constituted by a uniform succession of wavy corrugations which define in alternate sequence convex wave crests and concave wave troughs and that said heat exchanger comprises means for introducing said second fluid into said upper end in the vicinity of the convex wave crests of that face of said wall which is directed towards the second fluid.

In accordance with a first embodiment, the heat-transfer wall is a cylinder which has vertical generating-lines and the cross-section of which is a circle having uniform wavy corrugations, said wall being provided internally with respect to the upper portion thereof with a horizontal closure member provided with peripheral corrugations in cooperating relation with the corrugations of said wall, said closure member being provided with slots at the concave vertices of the corrugations of said internal closure member, said second fluid being introduced into said cylinder above said closure member, said first fluid being circulated externally of said wall.

In accordance with a second embodiment, the wall is a cylinder which has vertical generating-lines and the cross-section of which is a circle having uniform wavy corrugations, said wall being provided externally and at the upper portion thereof with a horizontal plate pierced by an orifice through which said cylinder is passed, said orifice being provided with corrugations in cooperating relation with those of said wall, the concave waves of said plate being provided with slots, said second fluid being introduced above said plate, said first fluid being circulated within the interior of said cylinder.

In accordance with a third embodiment, the heat exchanger comprises a plurality of heat-transfer walls, each wall being constituted by a substantially rectangular vertical plate, each plate being provided with corrugations having vertical generating-lines, the plates being juxtaposed along their rims in such a manner as to ensure that two adjacent plates define a leak-tight compartment, one compartment out of two being capable of receiving the primary fluid, the other compartments being capable of receiving the secondary fluid, said compartments for the primary fluid being provided with first means for supplying them in parallel with primary fluid, said compartments for the secondary fluid being provided with second means for supplying them with secondary fluid, each compartment for the secondary fluid being provided with a horizontal distribution element placed at the upper portion of said compartments, one end of said distribution element being connected to said second means and the other end being closed, said distribution element being provided with two series of holes located opposite to the crests of the waves of the internal faces of the two plates which constitute each compartment.

A more complete understanding of the invention will in any case be obtained from the following description of a number of embodiments which are given by way of example and not in any limiting sense, reference being made to the accompanying drawings, wherein:

FIG. 1 as described earlier is a horizontal sectional view of a corrugated heat-transfer wall;

FIGS. 2 and 3 are views respectively in perspective and in vertical cross-section showing two embodiments of straight-tube heat exchangers in accordance with the invention;

FIG. 4 is an exploded view in perspective showing a plate-type heat exchanger in accordance with the invention;

Figure 5:
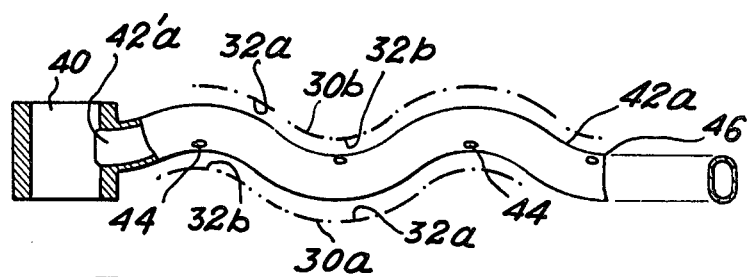
FIGS. 5, 7 and 8 are views showing different embodiments of the distribution elements.

In FIGS. 2 and 3, there are shown in perspective and in vertical cross-section two embodiments of a thin-film heat exchanger in accordance with the invention in which the heat-transfer surface has the general shape of a cylinder. These figures show more specifically a unitary heat-transfer cell. In actual practice, the heat exchanger proper comprises a plurality of cells of this type which are mounted in parallel.

In the embodiment which is illustrated in FIG. 2, the heat exchanger is constituted by a plurality of vertical tubes 2. These tubes are provided along their vertical generating-lines with corrugations such as those designated by the reference numeral 4. It is readily apparent that said corrugations define concave waves and convex waves. Consideration being given to the internal face of the cylinder 2, the concave waves are designated by the reference 6a and the convex waves are designated by the reference 6b. The cylinder 2 has extensions at both ends in the form of divergent nozzles 8 and 10. The ends of the divergent nozzles 8 and 10 are expanded into horizontal plates 12 and 14 so as to provide a leak-tight connection between said divergent nozzles and said plates. A closure plate 16 is provided within the interior of the cylinder 2 and at the upper end of this latter. Said plate also has a wavy profile constituted respectively by convex portions 18a and concave portions 18b. As can be understood, the convex waves 18a cooperate with the concave waves 6a and the concave waves 18b cooperate with the convex waves 6b in leak-tight manner. The closure plate 16 is provided with slots such as those designated by the reference numeral 20 which are located at the bottom of the concave waves 18b. In consequence, said slots 20 each form a passageway between the closure plate 16 and the tube 2 opposite to each convex wave 6b of the tube 2. The top convergent nozzle 8 is supplied with the fluid to be heated. This introduction is indicated by the arrow F. This fluid is stopped by the closure plate 16 and can pass downwards only through the slots 20. It is observed that this accordingly results in a supply in the form of narrow streams of secondary fluid which are localized opposite to the convex waves of that face of the heat-transfer wall which is directed towards the secondary liquid. As explained earlier, said narrow fluid streams spread along the cylinder 2 in very thin films along both the convex and the concave portions of the wavy corrugations and this fluid which has evaporated at the outlet of the divergent nozzle 10 is then collected. The primary fluid or hot liquid circulates externally of the tubes 2.

In accordance with the embodiment which is illustrated in FIG. 3, there is again shown the cylinder 2 with its concave and convex waves. In this embodiment, however, the fluid to be heated circulates externally of the cylinder 2, with the result that the convex waves 6'a (namely those which are directed outwards) were the concave waves 6a of FIG. 2 and that the concave waves 6'b were the convex waves 6b of FIG. 2. The cylinder 2 is joined at both ends to the plates 12' and 14' by convergent nozzles 8' and 10'. The closure plate 16' is constituted by a horizontal plate which is parallel to the plates 12' and 14' and located externally of the cylinder 2. The closure plate 16' also has concave waves 18'a and convex waves 18'b. At the bottom of the concave waves 18'a, the plate 16' is provided with slots such as those designated by the reference 20'. Said slots 20' are therefore located exactly opposite to the convex waves 18'b of the external face of the cylinder 2. In this embodiment, the secondary fluid is introduced (arrow F') into the space limited by the plates 12' and 16' and then flows through the slots 20' so as to form very thin films along the convex waves of the external wall of the cylinder 2. The secondary fluid which evaporates above the plate 14 is then collected.

In the embodiments described earlier, the heat-transfer surfaces were constituted by a plurality of vertical tubes having a generally cylindrical shape and provided with wavy corrugations. In the embodiments which will now be described, the heat-transfer surfaces are constituted by flat corrugated plates, each plate being intended to provide a separation between a region in which the secondary fluid circulates in a thin film and a region in which the primary fluid circulates. In other words, the plates are placed parallel to each other, two consecutive plates being intended to define a heat-transfer compartment and the contiguous compartments contain the primary fluid and the secondary fluid in alternate succession.

In FIG. 4, there is shown a first embodiment of a plate-type evaporator. The evaporator is constituted by a predetermined number of compartments placed in juxtaposed relation, said compartments being in turn defined by two consecutive heat-transfer surfaces. Provision is made in alternate succession for a compartment in which the primary fluid is circulated and a compartment in which the secondary fluid is circulated. FIG. 4 shows in perspective five heat-transfer plates which define four heat-transfer compartments consisting respectively of two compartments for the primary fluid and two compartments for the secondary fluid. In this figure, the different plates have been shown at a distance from each other in order that the general arrangement of the device may thus be more clearly understood. It is readily apparent, however, that in practice said plates are placed in juxtaposed relation and that provision is in fact made for more than four compartments.

The heat-transfer plates are designated by the reference numeral 30. FIG. 4 accordingly shows the plates 30a, 30b, 30c, 30d and 30e. Each plate is provided with vertical corrugations designated by the general reference numeral 32. The plates have a generally rectangular shape and are surrounded by a seal 34. It is therefore apparent that the compartments can be given a predetermined thickness by means of said seal 34 when the plates are mounted in juxtaposed relation. The plates 30a and 30b define a first compartment 36a for the secondary fluid whilst the plates 30c and 30d define a second compartment 36b for the same secondary fluid. The plates 30b and 30c define a first compartment 38a for the primary fluid and the plates 30d and 30e define a second compartment 38b for the primary fluid.

The supply of secondary fluid takes place through the feed tube 40 which is connected to distribution elements 42, said elements being placed within the compartments which correspond to the secondary fluid (namely those designated by the references 36a and 36b). The distribution element 42a is placed within the compartment 36a and the distribution element 42b is placed within the compartment 36b. One end of each distribution element 42 is connected to the feed tube 40 and said elements have wavy corrugations corresponding to the corrugations 32 of the plates 30. Consideration being given to that face of the plate 30a which is directed towards the interior of the compartment 36a, provision is made in alternate sequence for concave waves 32a and convex waves 32b. Similarly, on that face which is directed towards the interior of the compartment 36a, the plate 30b is provided with convex waves 32b and with concave waves 32a.

As mentioned earlier, the convex waves which are directed towards the secondary fluid flow zone must be supplied preferentially with secondary fluid. There is accordingly shown in greater detail in FIG. 5 one embodiment of the distribution elements 42 (the distribution element 42a, for example). The element 42a is constituted by a flattened tube of copper, for example, said tube being inserted between the plates 30a and 30b. The distribution element 42a has corrugations which cooperate with the corrugations of the plates 30a and 30b. The bottom face of the distribution element 42a is provided with two series of holes designated respectively by the references 44 and 46. The holes 44 which are nearest the plate 30a are located opposite to the convex waves 32b of the plate 30a. Similarly, the holes 46 are formed opposite to the convex waves 32b of the plate 30b. It is readily apparent that the distribution element 42a is closed at the end remote from the feed tube 40. Similarly, the compartments which are filled with primary fluid (namely the compartments 38a and 38b) are supplied through a duct which is actually constituted by all the orifices 48 and the portions of seals 50 arranged on the plates 30a, 30c and 30e in accordance with a known arrangement of plate-type heat exchangers. Similarly, the secondary fluid outlet is constituted by all the orifices 56 (only the orifice formed in the plate 30e is shown in FIG. 4) and by portions of seals which are identical with the seals 50 or 54 but are provided on the plates 30b and 30c in accordance with an arrangement which is also known.

Figure 6:
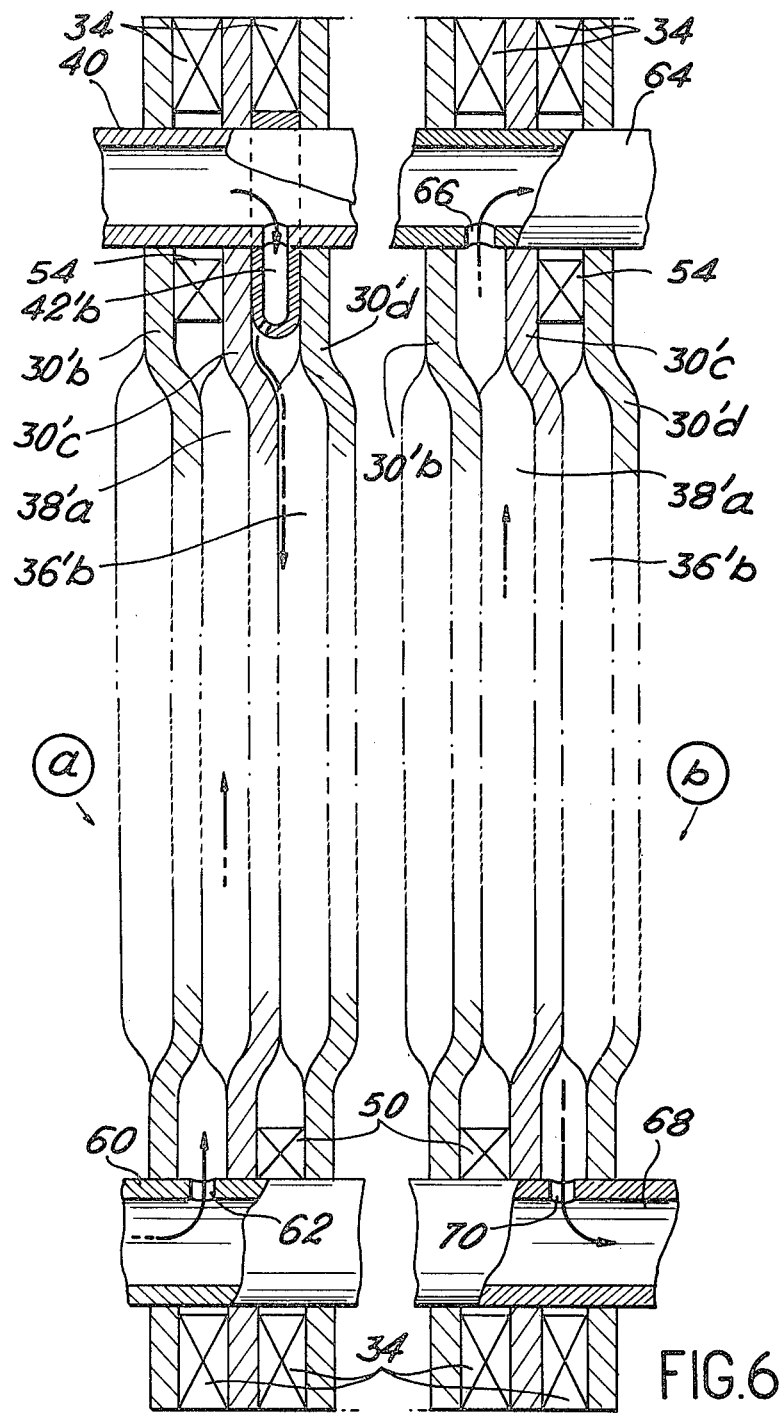
FIGS. 6a and 6b are two vertical sectional views of the heat exchanger which is illustrated in FIG. 4.

FIGS. 6a and 6b illustrate a simplified embodiment of the heat exchanger shown in FIG. 4; the sole object of these figures is to give a clearer illustration of the circulation of the two fluids within the evaporator. FIG. 6a shows one embodiment of FIG. 4 in a vertical sectional plane which passes through the tube 40 and the orifices 48; FIG. 6b is a vertical sectional view taken along a plane which passes through the orifices 52 and 56.

In this embodiment, it has been assumed that the plates 30 had flat portions at their upper and lowr ends, with the results that the distribution elements 42 could have a rectilinear rather than a wavy profile. Three consecutive plates as designated by the references 30'b, 30'c and 30'd define a compartment for the secondary fluid 36'b and a compartment for the primary fluid 38'a. There is again shown the feed tube 40 which communicates through an orifice with the distribution element 42'b. The seal 34 is also illustrated again in this figure. In order to show the circulation of the fluids more clearly, the orifices 38 and the seals 50 have been replaced by a continuous duct 60 provided with orifices such as 62 opposite to each compartment which contains the primary fluid. Similarly in FIG. 6b, the orifices 52 and the seals 54 have been replaced by an equivalent duct 64 provided with orifices 66 at the top portion of each compartment 38'. Again in this figure, the orifices 56 have been replaced by a duct 68 pierced by orifices 70 opposite to each compartment 36'. It is therefore apparent that the secondary fluid penetrates through the duct 40 and passes into the distribution elements 42. The fluid flows through the orifices 44 and 46 formed in said distribution element along the plates and in contact with the primary fluid. The evaporated secondary fluid is collected by means of the duct 68. So far as the primary fluid circuit is concerned, the circulation takes place as follows: the fluid is admitted through the duct 60, passes into the compartments 38' in the upward direction and is then discharged from these latter into the duct 64. It is readily apparent that this arrangement is applicable to all the compartments 36' and 38'.

Figure 7:
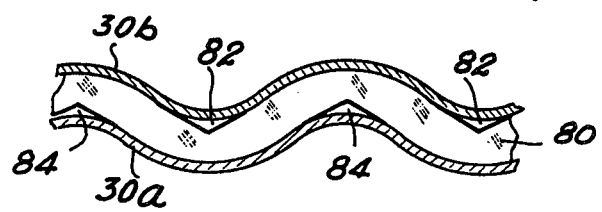
Figure 8:
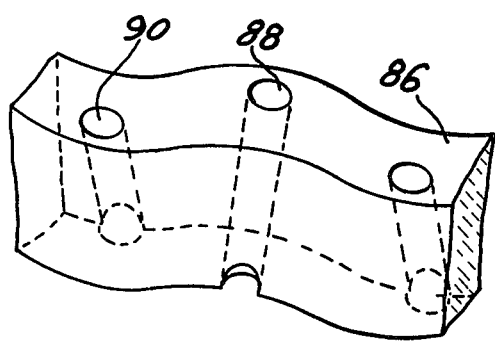

There is shown in FIG. 7 a top view of an alternative embodiment of the distribution elements. In this case, the distribution element is in fact replaced by a seal 80 which is horizontal and is compressed between two consecutive plates forming a compartment for the secondary fluid, namely the plates 30a and 30b, for example. Said seal is provided with openings 82 and 84 opposite to the convex waves of the plates 30a and 30b respectively. Said seal is placed at the same level as the bottom of the distribution elements 42. It is apparent in this case that the distribution space is in fact limited at the top portion thereof by the seal 34 of the plate 30a and 30b and at the bottom portion thereof by the seal 80. The secondary fluid flows through the openings 82 and 84. In FIG. 8, there is shown in perspective another embodiment of a seal which serves as a distribution element. Said seal which is designated by the reference numeral 86 has a certain thickness and the same wavy corrguations as the plates 30a and 30b. The seal is formed of plastic material, for example, and provided with metal inserts having the shape of small inclined tubes such as those which have been given the references 88 and 90. The lower ends of said tubes have their openings at the level of the convex waves of the plates 30a and 30b. Said tubes 88 and 90 are supplied with the secondary fluid which is present above the seal 86 between the plates 30a and 30b.

In the embodiment which is illustrated in FIG. 4, leak-tightness between the plates 30 is provided by means of a plastic seal 34. In the case of some secondary fluids, however, said seals are liable to be attacked. In order to prevent this, it proves necessary to employ seals made of very costly materials (in the case of compartments which contain the secondary fluid).

In actual fact, it is more reliable and more advantageous to replace the plastic seal 34 by a spacer member which has the shape of a rectangular frame having the same dimensions as the plates 30. This spacer member is placed between two plates which define a compartment for the secondary fluid. Said spacer member can be formed of chromized mild steel.

Similarly, the distribution seal 80 is of mild steel with slots for the passage of the liquid, said slots being machined or die-stamped. The unit which is formed by the two plates 30, the metal seal 34 and the distribution seal 80 is rigidly fixed by means of a leak-tight assembly of known type. This assembly can advantageously be formed by brazing in a vacuum furnace or in a fluorinated atmosphere.

In order to obtain leak-tightness between the two plates constituting a compartment for the primary fluid which has low corrosive action, it is possible to employ a seal of inexpensive material. This arrangement permits ease of disassembly of the primary fluid compartments. This is a necessary requirement when said fluid is water from a geothermal source which is charged with mud in the majority of instances. On the contrary, the secondary fluid circulates in a closed circuit and is not subject to pollution. It is therefore not necessary to contemplate disassembly of the compartments which contain this fluid.

In regard to the circular seals placed around the orifices 48 and 52 which are in contact with the corrosive fluid, said seals are formed of rubber, nitryl or products marketed under the trade names "Viton", "Teflon" and so forth.

In the event that the heat exchanger is employed as an evaporator in a solar engine installation, it is necessary to provide a condenser for the secondary fluid after this latter has passed through the engine. The structure of the heat exchanger which is shown in FIG. 4 makes it possible to mount both the evaporator and the condenser in a single frame.

The evaporator is constructed as shown in FIG. 4. In regard to the condenser, it is constructed of plates which are identical with the plates 30. Said plates define in alternate succession compartments for the working fluid and for the cooling fluid. It is readily apparent that no compartment is provided with any distribution element. The evaporator and the condenser are each fitted with an end-plate. A rectangular heat-insulating member is interposed between the condenser plates and the evaporator plates. It is readily apparent that this member is not provided with any orifices since there is not intended to be any direct communication between the condenser and the evaporator.

What we claim is:

1. A heat exchanger for exchanging heat between a first fluid or so-called hot fluid and a second fluid to be heated, of the type comprising at least one vertical wall which provides a separation between said fluids and through which a heat transfer process takes place, wherein the wall aforesaid which comprises an upper end and the cross-section of which is constituted by a uniform succession of wavy corrugations which define in alternate sequence convex wave crests and concave wave troughs, and wherein said heat exchanger includes means for introducing said second fluid at said upper end only in the vicinity of the convex wave crests of that face of said wall which is directed towards said second fluid.

2. A heat exchanger according to claim 1, wherein said wall is a cylinder which has vertical generating-lines and the cross-section of which is a circle having uniform wavy corrugations, said wall being provided externally and at the upper portion thereof with a horizontal plate pierced by an orifice through which said cylinder is passed, said orifice being provided with corrugations in cooperating relation with those of said wall, the concave waves of said plate being provided with slots, said second fluid being introduced above said plate, said first fluid being circulated within the interior of said fluid.

3. The heat exchanger of claim 1 wherein the means for introducing said second fluid includes a horizontal closure member separating an upper space for the introduction of said second fluid and a lower space, said lower space being limited by said wall, said closure member being tightly connected to the upper end of said wall and including slots at the convex wave crests of that face which is directed toward said second fluid.

4. The heat exchanger of claim 3 wherein said wall is cylindrical and the wavy corrugations extend vertically, said walls separating a first space for the first fluid and a second space for the second fluid, the upper portion of the second space being provided with a horizontal closure member having peripheral corrugations in cooperating relation with the corrugations of said wall, the closure member being provided with slots at the concave vertices of the corrugations of said member, said second fluid being introduced into the second space above said member, said first fluid being circulated through said first space.

5. A heat exchanger according to claim 1, wherein said wall is a cylinder which has vertical generating-lines and the cross-section of which is a circle having uniform wavy corrugations, said wall being provided internally with respect to the upper portion thereof with a horizontal closure member provided with peripheral corrugations in cooperating relation with the corrugations of said wall, the closure member being provided with slots at the concave vertices of the corrugations of said member, said second fluid being introduced into said cylinder above said closure member, said first fluid being circulated externally of said wall.

6. A heat exchanger according to claim 1, wherein said exchanger comprises a plurality of heat-transfer walls, each wall being constituted by a substantially rectangular vertical plate, each plate being provided with corrugations having vertical generating-lines, the plates being juxtaposed along their rims in such a manner as to ensure that two adjacent plates define a leak-tight compartment, one compartment out of two being capable of receiving the primary fluid, the other compartments being capable of receiving the secondary fluid, said compartments for the primary fluid being provided with first means for supplying them in parallel with primary fluid, said compartments for the secondary fluid being provided with second means for supplying them with secondary fluid, each compartment for the secondary fluid being provided with a horizontal distribution element placed at the upper portion of said compartments, one end of said distribution element being connected to said second means and the other end being closed, said distribution element being provided with two series of holes located opposite to the crests of the waves of the internal faces of the two plates which constitute each compartment.

7. A heat exchanger according to claim 6, wherein each distribution element is constituted by a flattened tube having wavy corrugations which conform exactly to the corrugations of the plates, the bottom portion of said tube being provided with two series of holes located opposite to the convex vertices of the corrugations of the internal faces of the two plates which constitute said compartment.

8. A heat exchanger according to claim 6, wherein each distribution element is constituted by a horizontal seal mounted in leak-tight manner between the two plates which constitute a compartment for the secondary fluid, said seal being parallel to the horizontal rim of said plates, said seal being provided with two series of vertical openings located opposite to the convex vertices of the corrugations of the plates which define said compartment.

9. A heat exchanger according to claim 6, wherein each distribution element is constituted by a horizontal seal mounted in leak-tight manner between the two plates which constitute a compartment for the secondary fluid, said seal being such as to have a certain thickness in the vertical direction, the entire thickness of said seal being traversed by two series of tubes which are inclined in a plane at right angles to said plates, the lower ends of said tubes being intended to have their openings in proximity to the convex vertices of the corrugations of the two plates which constitute said compartment.

10. A heat exchanger according to claim 6 wherein each plate is provided on one face with a seal of synthetic material mounted along the entire periphery of said plate.

11. A heat exchanger according to claim 6 wherein the two plates which constitute a compartment for the secondary fluid are assembled together by means of a metallic frame placed between the two plates along their entire periphery, the two contact faces of said plates being brazed to said plates.

12. A heat exchanger according to claim 9, wherein the distribution element is brazed to the plates and defines the corresponding compartment.

* * * * *